(12) United States Patent
Melton-Grace et al.

(10) Patent No.: US 12,542,771 B2
(45) Date of Patent: Feb. 3, 2026

(54) ENABLING SSO FOR EMBEDDED APPLICATIONS

(71) Applicant: Microsoft Technology Licensing, LLC, Redmond, WA (US)

(72) Inventors: Brian James Melton-Grace, Seattle, WA (US); Amarpreet Singh, Mill Creek, WA (US); Pavel Michailov, Redmond, WA (US); Adrian Frei, Seattle, WA (US); William Alden Bartlett, Lynnwood, WA (US); Shane Llewellyn Oatman, Las Vegas, NV (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 231 days.

(21) Appl. No.: 18/129,472

(22) Filed: Mar. 31, 2023

(65) Prior Publication Data
US 2024/0333703 A1 Oct. 3, 2024

(51) Int. Cl.
*H04L 9/40* (2022.01)
(52) U.S. Cl.
CPC ...... *H04L 63/0807* (2013.01); *H04L 63/0815* (2013.01)
(58) Field of Classification Search
CPC ............ H04L 63/0807; H04L 63/0815; H04L 63/0884; G06F 21/41
See application file for complete search history.

(56) References Cited

U.S. PATENT DOCUMENTS

| | | | |
|---|---|---|---|
| 2013/0086669 A1 | 4/2013 | Sondhi | |
| 2015/0341347 A1* | 11/2015 | Kong | H04L 63/0853 726/4 |
| 2018/0240118 A1* | 8/2018 | Lee | G06F 16/986 |
| 2019/0069168 A1 | 2/2019 | Belote | |
| 2022/0391266 A1* | 12/2022 | Eatough | G06F 9/541 |
| 2022/0417021 A1* | 12/2022 | Singhal | H04L 9/3226 |

OTHER PUBLICATIONS

International Search Report and Written Opinion received for PCT Application No. PCT/US2024/019623, May 22, 2024, 15 pages.
"Microsoft Graph satisfaction survey", Retrieved From: https://developer.microsoft.com/en-us/graph, Retrieved on: Dec. 16, 2022, 6 Pages.

(Continued)

*Primary Examiner* — Henry Tsang
(74) *Attorney, Agent, or Firm* — Workman Nydegger

(57) ABSTRACT

Techniques for enabling a hub application to perform token brokering on behalf of an embedded application, which is embedded in the hub application, to thereby hydrate an authentication state for the embedded application are disclosed. An authentication sign-in event is performed to authenticate a hub application with an account. As a result, the hub application receives, from a token broker platform, a first access token that represents a hydrated authentication state with the account. An embedded application is launched. While refraining from performing a subsequent authentication sign-in event, the hub application performs token brokering on behalf of the embedded application. The hub application sends a second access token to the embedded application.

20 Claims, 15 Drawing Sheets

(56) References Cited

OTHER PUBLICATIONS

Sakimura, et al., "Proof Key for Code Exchange by OAuth Public Clients", Retrieved From: https://tools.ietf.org/html/rfc7636, Sep. 2015, 20 Pages.

International Preliminary Report on Patentability (Chapter I) received for PCT Application No. PCT/US2024/019623, Oct. 9, 2025, 10 pages.

* cited by examiner

ENABLING SSO FOR EMBEDDED APPLICATIONS

BACKGROUND

A Web View is a standard user interface (UI) element used by application developers who wish to render web-based HTML, CSS, and JavaScript content in the context of a native (e.g., rich client or hub) application. Typically, a Web View is rendered in-process and does not have access to a globally shared system cookie jar.

When a web application is launched inside of a Web View, there is no session state, cookie, or authentication token available to the document object model (DOM) to enable a secure single sign on (SSO) experience. Thus, the user is typically forced to sign-in again by entering his/her username or password.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

Embodiments disclosed herein relate to systems, devices, and methods for enabling a hub application to perform token brokering on behalf of an embedded application, which is embedded in the hub application, to thereby hydrate an authentication state for the embedded application.

Some embodiments perform an authentication sign-in event to authenticate a hub application with an account. As a result of the hub application being authenticated, the hub application receives, from a token broker platform, a first access token that represents a hydrated authentication state with the account. The token broker platform operates as a central single sign on (SSO) store for applications executing on the computer system.

The embodiments launch, from within the authenticated hub application, the embedded application. The embedded application is initially stateless such that the embedded application is not authenticated with the account.

While refraining from performing a subsequent authentication sign-in event, the embodiments cause the hub application to perform token brokering on behalf of the embedded application to enable the embedded application to acquire a second access token that also represents the hydrated authentication state with the account. The token brokering process includes the hub application receiving, from the embedded application, a request to obtain the second access token. The process further includes the hub application delegating acquisition, retrieval, or generation of the second access token to the token broker platform by sending the request to the token broker platform. The process includes the hub application receiving, from the token broker platform, the second access token. The second access token is obtained based on the hydrated authentication state that currently exists for the account. The process also includes the hub application sending the second access token to the embedded application.

In some embodiments, the request mentioned above is received over a communication bridge that exists between the hub application and the embedded application. In such scenarios, a service or interface is provisioned as a part of the communication bridge. The service enables a scripting language that is a part of the embedded application to communicate with a native language that is a part of the hub application.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
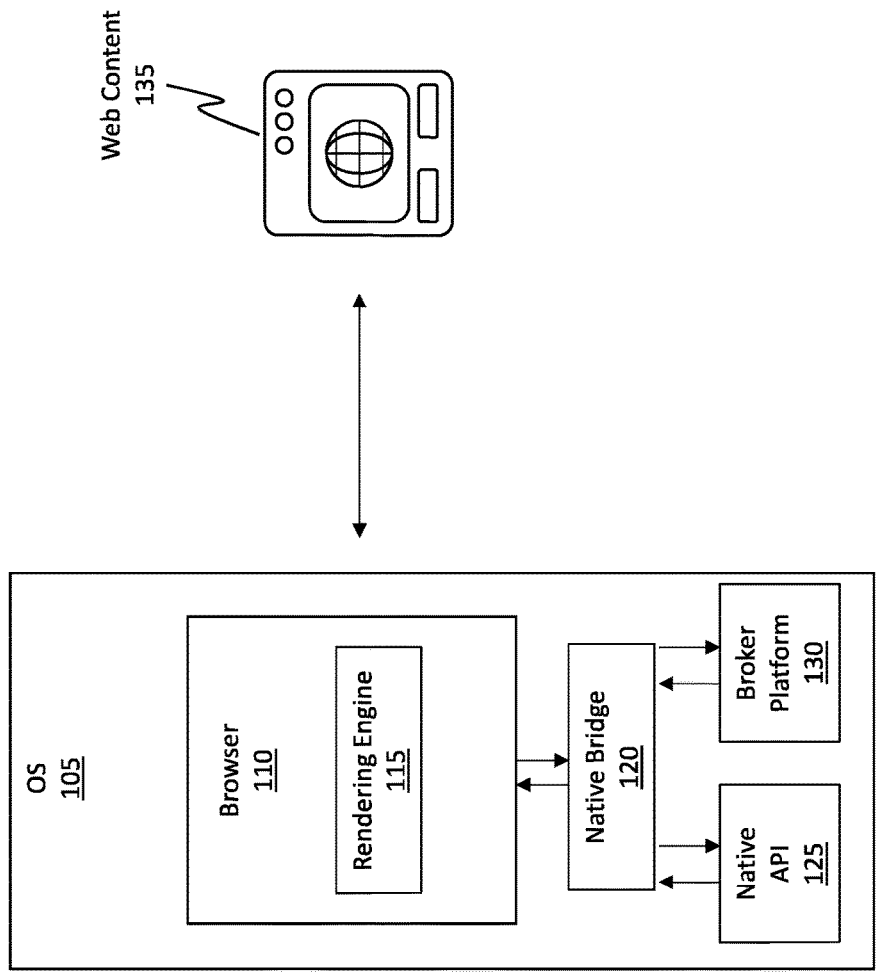
FIG. 1 illustrates an example architecture involving a native application.

Embodiments disclosed herein relate to systems, devices, and methods for enabling a hub application to perform token brokering on behalf of an embedded application, which is embedded in the hub application, to thereby hydrate an authentication state for the embedded application. The embodiments beneficially solve a so-called "double sign-in" problem that has existed for embedded applications. A "double sign-in" occurs when a user must sign-in first to the rich client application (i.e. the hub or native application) and then sign-in again to any web applications hosted within that application's Web Views. It should be noted how the disclosed embedded application's runtime does not necessarily need to be a Web View. For instance, the embedded application can optionally be an application that does not include a user interface runtime, such as a headless browser or a JavaScript engine.

Some embodiments perform an authentication sign-in event to authenticate a hub application with an account. As a result, the hub application receives, from a token broker platform, a first access token that represents a hydrated authentication state with the account. The embodiments launch the embedded application. The embedded application is initially stateless.

While refraining from performing a subsequent authentication sign-in event, the embodiments cause the hub application to perform token brokering on behalf of the embedded application. The token brokering process includes the hub application receiving, from the embedded application, a request to obtain a second access token. The process further includes the hub application delegating acquisition, retrieval, or generation of the second access token to the token broker platform. The hub application receives, from the token broker platform, the second access token. The second access token is obtained based on the hydrated authentication state that currently exists for the account. The hub application sends the second access token to the embedded application.

In some embodiments, a communication bridge exists between the hub application and the embedded application. In such scenarios, a "service" or "interface" is provisioned as a part of the communication bridge. In some embodiments, the "service" or "interface" can be a platform-specific application programming interface (API). The service enables a scripting language that is a part of the embedded application to communicate with a native language that is a part of the hub application.

Examples of Technical Benefits, Improvements, and Practical Applications

The following section outlines some example improvements and practical applications provided by the disclosed embodiments. It will be appreciated, however, that these are just examples only and that the embodiments are not limited to only these improvements.

Typically, a Web View is rendered in-process and does not have access to a globally shared system cookie jar. When a web application is launched inside of a Web View, there is no session state, cookie, or authentication token available to the document object model (DOM) to enable a secure single sign on (SSO) experience. Thus, the user has traditionally been forced to sign-in again by entering his/her username or password. This can cause a problem where a "double sign-in" is required. An example will be helpful.

Suppose a user signs-in to Microsoft TEAMS and launches a 3rd party application acquired from the TEAMS App Marketplace. The acquired application would then be loaded in a TEAMS in-process Web View component which, due to its lack of identity/SSO state, then requires the user to sign-in to the 3rd party application to use it. This creates friction and a fragmented experience for users as they navigate between the TEAMS first party experience and the third party application experience.

The disclosed embodiments provide various solutions to these problems, thereby eliminating the friction felt by users. The disclosed solutions enable token and device binding for SSO credentials for first party and third party applications that are hosted inside of another application. Stated differently, the disclosed protocols and techniques enable token brokering for hosted applications to thereby solve the "double sign-in" problem. To do so, the embodiments configure the host application or, alternatively, a system token broker to operate as a source of identity that can provide SSO tokens to the hosted application.

Beneficially, the embodiments can optionally employ two protocols. The first is called "single brokering" whereby a hosted application delegates to its immediate host to provide the source of identity about the active user. The host application then acquires tokens on the hosted application's behalf.

The second protocol is called "double brokering" whereby the host delegates to an external source of identity (such as an operating system or an authentication server) to provide the source of identity and to acquire tokens on behalf of the hosted application. Double brokering has the unique capability to ensure that device identifiers can be included in the SSO artifacts yielded to the hosted application. Double brokering also allows for the satisfaction of various device security policies. In some implementations, the external source of identity (e.g., the authentication service) is involved in all, most, or at least some of the token acquisition processes because, in some cases, the external source of identity is the entity that issues tokens signed with the necessary key. For example, in some implementations of the double broker protocol, the hub application delegates token acquisition to the operating system (OS), which then uses a trusted artifact it has for the user (which it obtained from the authentication server earlier). The OS can then use that trusted artifact to obtain a new token on behalf of the hub (and ultimately on behalf of the embedded app).

By way of more detail, the disclosed embodiments also enable various device identifiers to be obtained by the embedded application. In most embodiments, the device identifier is a generated value, which is persisted, to uniquely identify the device. For instance, in most embodiments, the device identifier is a specific identity associated with one or more of a user identity or a device identity. In a few embodiments, the device identifiers can include an IMEI, MAC address, or some other stable data value that is available across an enrollment or disenrollment process. That being said, the scenario where the unique identifier is associated with the user identity or the device identity is preferred. For example, a MAC address can be associated with a physical network hardware, such as a NIC, which can be swapped out, thereby altering the MAC address. Because the unique identifier is persisted (e.g., perhaps by the OS or perhaps by the platform broker), swapping physical networking hardware would not alter the device identifier.

In some cases, administrators for networks and organizations can put resource access policies around data. In order to access e-mail data, a device may need to be registered and known to a tenant. For this registration process to be performed, the device's identifiers are used. Notably, these device identifiers can be accessed by an operating system, they do not typically exist in a native application or an embedded application. The device identifiers are typically set by the authentication server. The OS can optionally include a key that the OS can use to prove its device identity to the authentication server. Via the brokering processes outlined herein, the embodiments are able to provide device identifiers to an embedded application to thereby enable the embedded application to call on or operate on behalf of the unique name of the device. On some platforms, the embodiments rely on the system or platform broker to provide the device identifier. Often, these identifiers may not be present when single brokering is used (e.g., because the embedded application's immediate host does not possess this data). Double brokering (e.g., through delegation to a platform or system broker) often does enable the device identifier to become available.

Generally, the embodiments beneficially reduce the number of steps a user performs when interacting with applications, particularly with regard to the authentication process. Such reductions improves the user's experience with the computer system. Additionally, the embodiments are able to intelligently reuse data (e.g., access tokens), thereby improving the efficiency of computer system. As yet another benefit, the embodiments are able to flow sign-in state from the operating system to an arbitrary level of embeddedness with respect to embedded applications. Yet another advantage is that renewal of the authentication (e.g., AuthN) for either the embedded application or the native/hub application can then automatically ensure renewal of the other associated application. For example, a proxy can optionally correlate the tokens for the two applications. As a result, renewal of one will also result in the renewal of the other token, thus avoiding duplicate prompts to re-authenticate. Accordingly, these and numerous other benefits will now be described in more detail throughout the remaining sections of this disclosure.

Example Architecture(s)

Attention will now be directed to FIG. 1, which illustrates an example architecture 100 demonstrating generally how a "native" or "hub" application operates. As used herein, the phrase "native application" refers to an application that has been written in a programming language designed for a specific platform or operating system (OS). Native applications also typically have user interfaces (UIs) whose frameworks are designed for the specific platform.

Stated differently, a native application is typically not an application that is considered to be a cross-platform application running in a browser. Regarding the programming language of the native application, examples of such programming languages include, but certainly are not limited to, Java, C#, C++, Objective-C, and so on, without limit. These types of programming languages are able to work in concert with, or rather work efficiently with, a device's OS platform.

FIG. 1 shows an example of a native application. Specifically, FIG. 1 shows an OS 105 of a device. A browser 110, which is an example of a native application, is operating on the OS 105. The browser 110 is an example of a native application while an application that runs in the browser 110 would not be an example of a native application; instead, that application is an example of a so-called "web app," further details on this aspect will be provided shortly. Examples of some other native application include, but are not limited to, Microsoft's TEAMS application, Microsoft's Office suite application, or any other downloaded application.

The browser 110 can include or interact with a rendering engine 115 to render content. Additionally, the browser 110 can interact with the OS's native APIs via a native bridge 120 that exists. An example of the native bridge 120 can be that of the OS's shell. The shell is often viewed as the outermost layer of the OS. The shell is the interface that allows native applications to interact with the OS to allow those applications to use a device's resources.

Using the native bridge 120, the browser 110 can interact with a native API 125. The native API 125 is a lower-level interface that applications can use to interact with the OS. The native API 125 can be accessed via the native bridge 120.

Optionally, the browser 110 can be authenticated with the OS via the use of a broker platform 135. The broker platform 135 operates as a central single sign on (SSO) store for applications executing on the device (e.g., native applications). Stated differently, the broker platform 135 is a type of registration and authentication/certification service or authority that authenticates clients and/or applications.

Certain platforms host token brokers (i.e. broker platforms) that act as a central SSO store across all of the user's applications on a given device. At the protocol level, this capability is implemented via the Primary Refresh Token (PRT) protocol. The central grant in the PRT protocol is the Primary Refresh Token. A Primary Refresh Token can be used to obtain tokens for any application, as opposed to Refresh Tokens (RTs) which are restricted to a single application or, in certain cases, a predefined group of applications.

Native applications request tokens from the token broker over an exposed API, typically specifying their application ID, the resource for which they need tokens, as well as other context-specific parameters. The token broker will, in turn, attempt to redeem the PRT in its possession for a token on behalf of the requesting application. In addition, on platforms where package signing is supported, the PRT protocol describes client authentication based on an identifier tied to the package.

The browser 110 is also able to communicate over a network to obtain web content 135. The rendering engine 115 can be used to display the web content 135.

Figure 2:
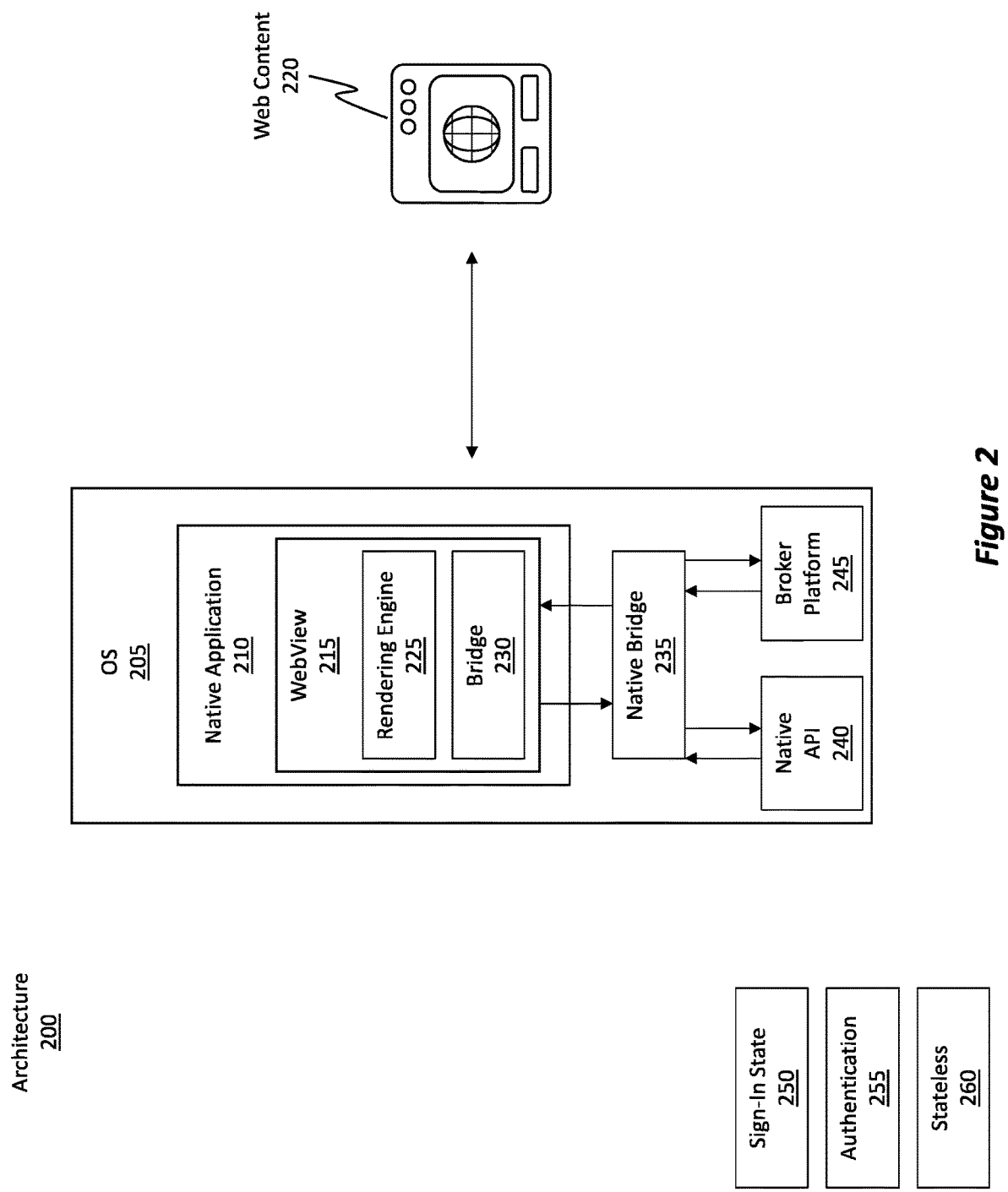
FIG. 2 illustrates an example architecture involving an embedded application that is embedded in a native application.

Whereas FIG. 1 presented subject matter related to a native application, FIG. 2 presents subject matter related to an embedded application hosted in or executing in a Web View. In particular, FIG. 2 shows an example architecture 200 that includes an OS 205 and a native application 210, which can optionally be representative of the browser 110 from FIG. 1 (or any other native application).

In this particular example, an embedded application is embedded in the native application 210; that embedded application is hosted in or executing in Web View 215. Web View 215 is a type of embeddable browser that the native application 210 can call in order to display web content 220. By way of more detail, the Web View 215 can be viewed as being a browser engine portion that can optionally be embedded into the native application 210 so that the native application 210 can display highly dynamic information. In this sense, the Web View 215 is a type of embeddable visual feature. There may or may not be trust isolation between the hub application and the embedded application, depending on the security posture chosen by the hub.

Web View 215 is one example of an embeddable runtime for an embedded application. Details provided later in this disclosure will be focused more generally on embedded applications. At this point, an example may be helpful. Suppose a native application exists in the form of an email client. A user opens a ride share extension in the context of that user's email client. The ride share extension (e.g., with user permission) scans the contents of the currently-open email and extracts addresses. The ride share extension then offers to book a ride for the user to the addresses discovered in the user's email. In this scenario, the email is the native application, and the ride share extension is the embedded application. Traditionally, there have not been workable solutions for developers to enable the embedded application to be authenticated without having to require the user to perform another sign-in event.

These embedded applications may rely on an identity to operate. To obtain that identity, the embedded applications have traditionally required an additional sign-on event. The disclosed embodiments present a brokering protocol that enables a device to hydrate authentication and identity state into an embedded application by using a hosting application (e.g., the native application aka a "hub application") as a source of that identity or as a medium for obtaining that identity, such as by operating as a broker on behalf of the extension or embedded application.

In the above example, the ride share application can include tokens that correspond to the user, such as various access tokens, identity tokens, or even refresh tokens. Alternatively, the ride share application has an understanding as to where those tokens can be obtained. In any event, the embodiments allow those same set of tokens or perhaps tokens that are based on the same authentication event to be used by an embedded application.

Returning to FIG. 2, Web View 215 can include or interact with a rendering engine 225 to render the web content 220. In accordance with the disclosed principles (and as will be discussed in more detail shortly), a communication bridge 230 is included between the Web View 215 and the native application 210. The bridge 230 allows communications to pass between the Web View 215 and the native application 210.

Architecture 200 also shows the native bridge 235, which is representative of the native bridge 120 from FIG. 1. Thus, in accordance with the disclosed embodiments, the architecture includes at least two bridges. These bridges include the bridge 230, which facilitates communications between the Web View 215 and the native application 210, and the native bridge 235, which facilitates communications between the native application 210 and the OS 205. Architecture 200 also shows a native API 240 and a broker platform 245, which are representative of the native API 125 and broker platform 130 of FIG. 1, respectively.

Certain native applications (e.g., native application 210) may act as hosts for multiple child applications (e.g., the Web View 215). For such applications, it may not be desirable to have the children interact directly with the token broker (e.g., broker platform 245). This may be because the child applications are abstracted from the execution environment, or, in the case of platforms with package signing requirements, may be impossible without forcing the child applications to couple themselves to the package metadata of their host. It is desirable, however, to be able to easily authenticate these child applications without requiring an additional sign-in.

The native application 210 is often associated with an account, such as perhaps a user account, an enterprise account, a tenant account, or perhaps any other type of account. Often, when the native application 210 is initialized, the native application 210 will request to be authenticated with the account. As a result, a user or other entity may have to login to the account by presenting a set of credentials. If those credentials are valid, then the native application 210 is authenticated with the account, and the sign-in state 250 for the native application can be considered to be authenticated or hydrated with an authentication 255.

When Web View 215 is initialized, the Web View 215 is stateless 260, meaning that the Web View 215 does not have sign-in state 250 and it is not hydrated with authentication. Stateless also includes a scenario where no cookies are stored.

Figure 3:
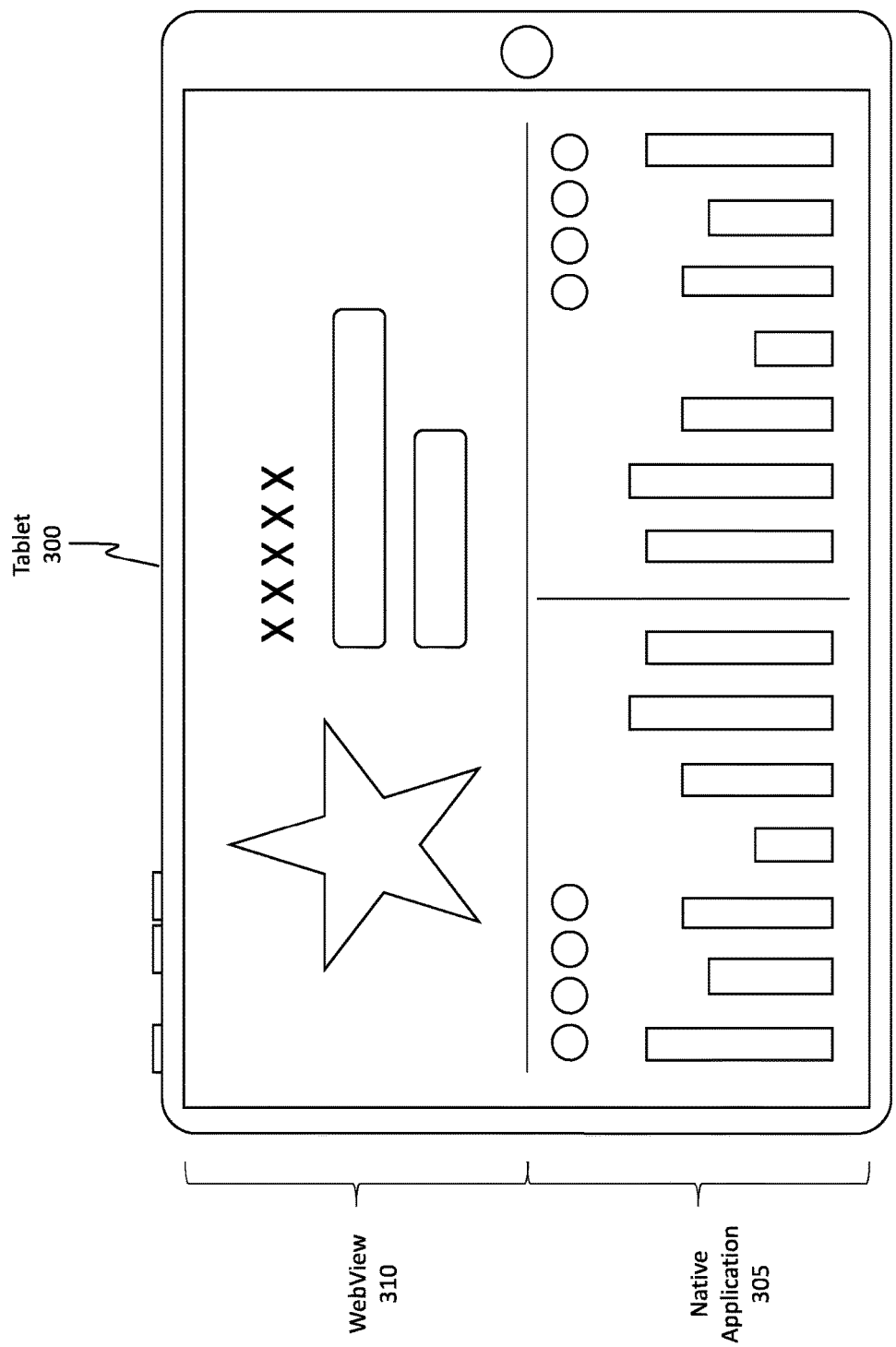
FIG. 3 illustrates an example of a WebView, which is an example of an embedded application.
Figure 4:
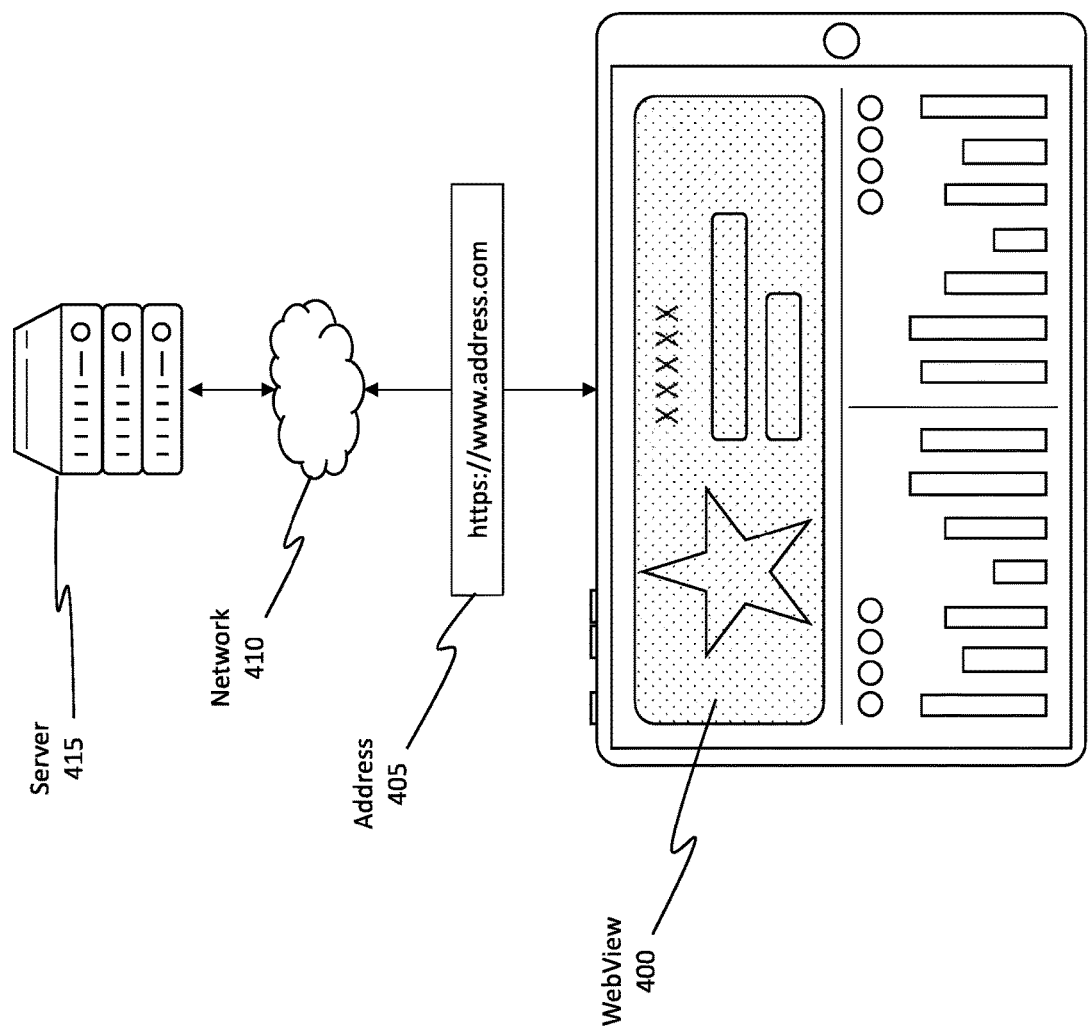
FIG. 4 illustrates how a Web View operates.

In order to authenticate the Web View 215, it has traditionally been the case that the user will have to submit, for a second time (e.g., the first being the time when the native application 210 was authenticated), the user credentials. Requiring the user to repeatedly submit credentials creates delays, user frustration, and other hassles for the user. The disclosed embodiments provide a seamless technique for authenticating a Web View, or any other type of embedded application, without requiring the user to submit, for a second or subsequent time, user credentials. Instead, a single sign on (SSO) event can be performed, and the SSO can be used to not only authenticate the native application 210 but also the embedded application (e.g., the Web View 215). FIGS. 3 and 4 provide some additional details regarding a Web View. It should be noted, however, how any type of embedded application that is embedded in a native application or perhaps even one that is embedded in another embedded application can be used. The Web View is being provided simply for example purposes only.

FIG. 3 shows an example device in the form of a tablet 300. Tablet 300 is displaying contents from a native application 305. Tablet 300 is also displaying contents from a Web View 310. In this example scenario, the Web View 310 is an example of an embedded application that is embedded in the native application 305.

FIG. 4 shows how a WebView 400 uses an address 405 to communicate over a network 410. The Web View 400 is able to obtain content from a server 415 and then display that content on the device.

Authentication Process Flow

Figure 5:
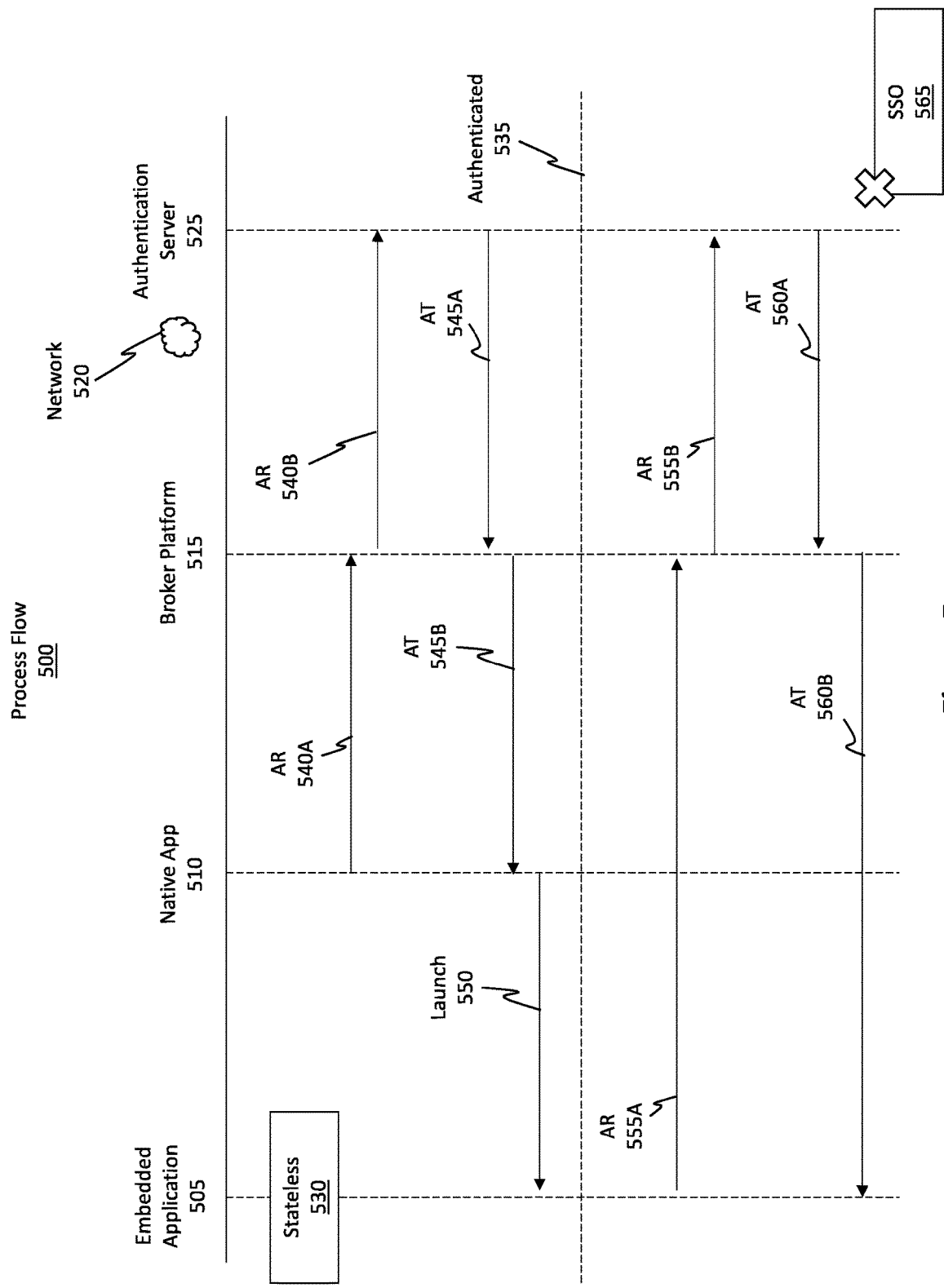
FIG. 5 illustrates a process flow for authenticating an embedded application.

FIG. 5 shows an example of a process flow 500 in which an SSO option is not available to an embedded application 505. Process flow 500 involves the embedded application 505, a native application 510, a broker platform 515, a network 520, and an authentication server 525 (which can be implementing a security token service). As described previously, the embedded application 505 is stateless 530.

When the native application 510 is first initialized, the native application 510 will often attempt to be authenticated with an account. FIG. 5 illustrates the authentication process for the native application with the various actions above the dashed authenticated 535 line. The operations below the authenticated 535 line are actions for authenticating the embedded application 505 without enabling a SSO.

Initially, the native application 510 submits an authentication request (AR) 540A to the broker platform 515. The broker platform 515 transmits that request (e.g., AR 540B) over the network 520 to an authentication server 525. The authentication server 525 validates the request and attempts to authenticate the native application 510. In embodiments, the validation is based on the credentials the user provided as a part of the AR 540A, via multi-factor authentication, via passwordless authentication validations (which may be via communications with other devices), multi-factor authentication responses, or any combination thereof.

If the credentials are valid, then the authentication server 525 returns an access token (AT) 545A to the broker platform 515. The broker platform 515 then transmits the AT 545B to the native application 510. The native application 510 can then use the received AT for authentication and/or authorization (e.g., used as proof of allowed entry) with various APIs and other resources.

The native application 510 may then trigger the launch 550 of the embedded application 505. As an example, suppose the native application 510 is Microsoft's TEAMS application, and the embedded application is an email scanning application that is a plugin or extension for the TEAMS application. For instance, the email scanning application may be tasked with scanning a user's emails and then automatically generating a TEAMS calendar invite for scheduled meetings identified within the emails. In order to access those emails, the email scanning application will need to be authenticated. Traditionally, the user would be required to enter, for a second time (e.g., after the initialization of the native application 510), his/her credentials. Thus, previous authentication techniques involving an embedded application failed to enable SSO, as shown by FIG. 5.

For instance, when the embedded application 505 is launched, it is stateless 530. As a result, the embedded application 505 is tasked with being authenticated. To do so, the embedded application 505 would submit an access request (AR) 555A to the broker platform 515 (e.g., provided the embedded application 505 could communicate directly with the broker platform 515). This AR 555A would include newly entered credentials. The broker platform 515 would then send the AR 555B to the authentication server 525. The authentication server 525 would attempt to authenticate the native application. In embodiments, the authentication is based on the received credentials. Optionally, multi-factor authentication via non-password authentication validations can be used. Optionally, multi-factor authentication responses, or any combination of the above, can also be used. An access token (AT) 560A is then generated. The AT 560A is accessed or retrieved by the broker platform 515. That is, the AT 560A would be sent to the broker platform 515, which would then send the AT 560B to the embedded application 505. In this manner, SSO 565 was not enabled for the embedded application 505. In some scenarios, the AR 555A does not include the credentials but rather the AR 555A includes an indication of the identity for which an access token is being requested.

Improved Architectures

The disclosed embodiments enable SSO to be achieved, even in scenarios involving both a native application and an embedded application. In particular, the embodiments enable a hub application (e.g., the native application) to perform token brokering on behalf of an embedded application, which is embedded in the hub application, to thereby hydrate an authentication state for the embedded application. Stated differently, the embodiments are effectively able to allow the embedded application to inherit the authentication state that is provided to the hub/native application.

Generally, there are three entities involved in the token brokering protocol. These entities include a parent or hub application, a child application (i.e. the embedded application, which can be an iframe inside the hub), and a system token broker.

As a quick introduction, the child application sends a message to the hub application. The child application supplies its client ID and a scope for a desired token. The hub application assembles the child's reply address from its own client ID and the child application's origin. The hub application then sends a request to the system token broker with the child application ID, the child application reply address, and the scope requested by the child.

Figure 6:
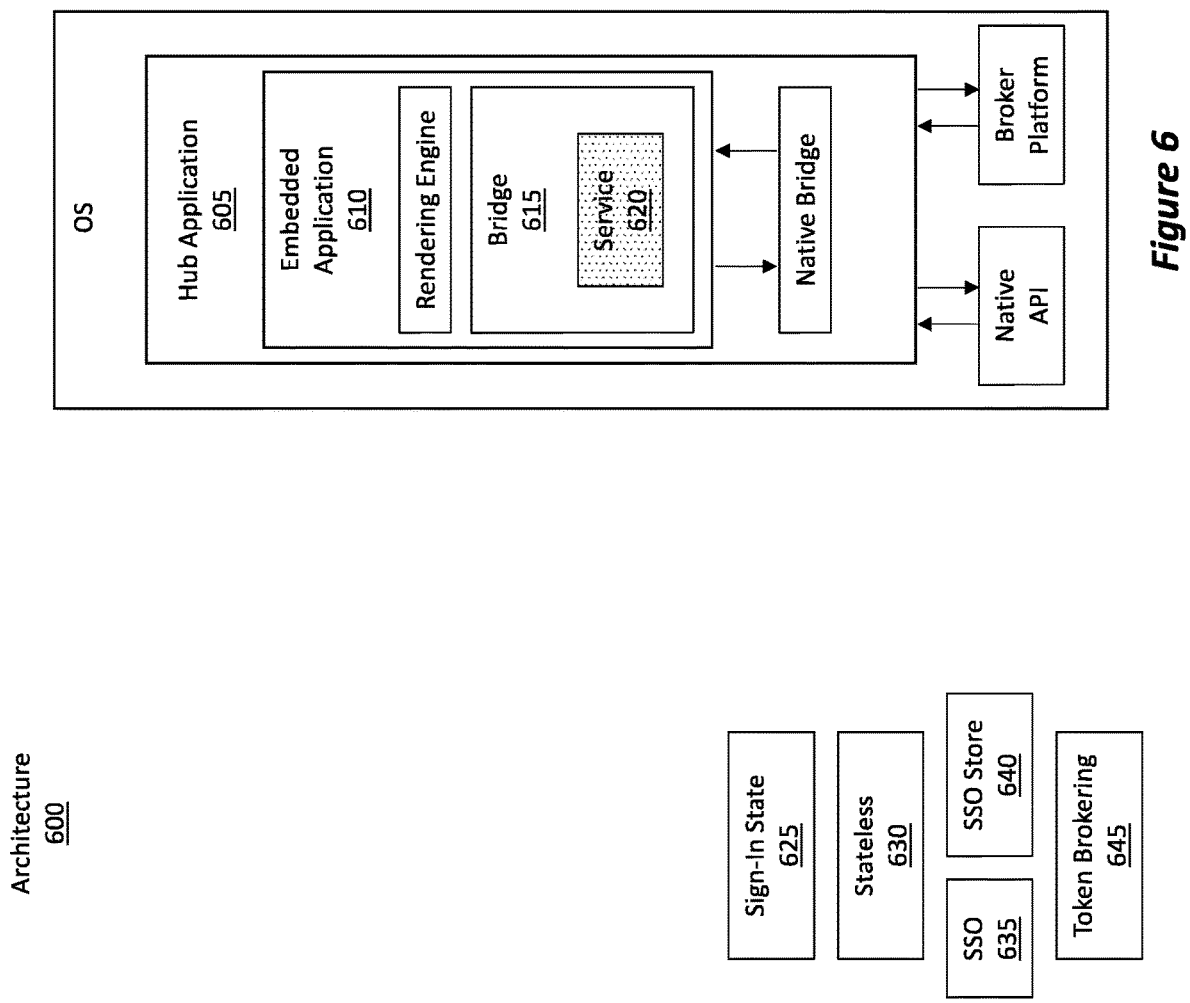
FIG. 6 illustrates an improved architecture involving a native application and an embedded application.

The system token broker assembles the reply address by using the system token broker prefix and the received request package. The system token broker combines these various parameters, including the reply address, into a request to the authentication server, which is hosting a token service. The token service validates the parameters and returns to the token broker an access token (AT) for the child and optionally a refresh token (RT). The system broker passes the AT and optionally RT to the hub application. The hub application can optionally cache the new RT. The hub application passes the AT to the child application. If no refresh token exists, then a new access token can be requested. In some scenarios, token acquisitions are mediated by the OS. In such scenarios, the refresh token might not be supplied to the applications themselves. FIG. 6 shows an example architecture 600 that can be used to achieve these various benefits and operations. The act of requesting or refreshing tokens, either by the hub or the embedded application, will typically result in new refresh tokens being sent to the hub application. In this sense, the hub and embedded applications can optionally both play a role in supporting the continued access to resources requested by either the hub or embedded application without necessarily having to re-prompt the user for sign-in.

Architecture 600 shows many of the same features and components as was shown in FIG. 2. Here, the "native application" of FIG. 2 has been renamed as a hub application 605, and the "Web View" of FIG. 2 has been renamed as embedded application 610. A bridge 615 exists between the embedded application 610 and the hub application 605. The bridge 615 is representative of the bridge 230 of FIG. 2.

In some implementations, the embedded application 610 is a web application (e.g., a Web View application). The embedded application 610 can be considered as being abstracted from the operating system (OS) of the computer system. Thus, in some scenarios, the embedded application 610 is prevented from authenticating directly with the OS.

Optionally, this web application is one that uses one or more of HyperText Markup Language (HTML), Cascading Style Sheets (CSS), or JavaScript. Optionally, the embedded application 610 can be one of a first party extension application or a third party extension application. First party extension applications are ones that are controlled or managed by the same entity that owns the domain in which the hub application 605 is operating. Third party extension applications are ones that are not controlled by the same entity that owns the domain in which the hub application 605 is operating.

In accordance with the disclosed principles, the embodiments configure the bridge 615 to include a service 620 or interface. As used herein, the term "service" refers to an automated program that is tasked with performing different actions based on input. In some cases, service 620 can be a deterministic service that operates fully given a set of inputs and without a randomization factor. In other cases, service 620 can be or can include a machine learning (ML) or artificial intelligence engine.

As used herein, reference to any type of machine learning or artificial intelligence may include any type of machine learning algorithm or device, convolutional neural network(s), multilayer neural network(s), recursive neural network(s), deep neural network(s), decision tree model(s) (e.g., decision trees, random forests, and gradient boosted trees) linear regression model(s), logistic regression model(s), support vector machine(s) ("SVM"), artificial intelligence device(s), or any other type of intelligent computing system. Any amount of training data may be used (and perhaps later refined) to train the machine learning algorithm to dynamically perform the disclosed operations.

The communication bridge 615, and in particular the service 620, operates to convert an operation implemented in a scripting language of the embedded application 610 to an operation implemented in a native language the hub application 610. Communicating over this communication bridge 615, in some instances, involves adding an object into a global namespace for the embedded application 610. When that object is invoked, that object enables communication across the trust boundary between the embedded application 610 and the native code of the hub application 605.

The service 620 is provisioned as a part of the communication bridge 615 between the hub application 605 and the embedded application 610. As indicated above, the service 620 enables a scripting language that is a part of the embedded application 610 to communicate with a native language that is a part of the hub application 605.

As described previously, the hub application 605 can be authenticated and thus can have a hydrated sign-in state 625. When the embedded application 610 is launched from the hub application 605, however, the embedded application 610 is initially stateless 630. In accordance with the disclosed principles, the embodiments allow various communications to occur over the bridge 615 and the native bridge so that the previous SSO 635 event (for the hub application 605) can be relied on to also authenticate the embedded application 610.

As mentioned previously, the broker platform operates a single SSO store 640 for applications executing on the OS of the device, which applications include the hub application 605. The embodiments also configure the hub application 605 to perform token brokering 645 on behalf of the embedded application 610. Accordingly, the embodiments are able to leverage the authentication sign-in event 650 of the hub application 605, in which the hub application 605 is authenticated with an account 655, to also authenticate the embedded application 610. Beneficially, the hub application can refresh its own tokens at will. The hub application can also refresh the tokens of the embedded application according to a request from the embedded application or in response to a "keep fresh" policy specified on the hub application. Such a policy ensures that the embedded application's tokens do not reach their expiry. The embedded application can also request refreshed tokens for itself from the hub application. That request may conditionally result in a new refresh token being acquired by the hub application for itself as well.

In particular, a first access token 660 is provided to the hub application 605 as a part of the authentication process. Later, a second access token is provided to the embedded application 610. This second access token represents the authentication state 665 for the embedded application 610, which relied on the authentication state of the hub application 605. Optionally, the second access token can be the same as the first access token or, alternatively, the second access token can be a copy of the first access token or a different instance of the first application token.

Some embodiments also limit the access token for the embedded application by removing certain permissions relative to the hub application's token. Some embodiments limit the access token for the embedded application by causing the access token to be valid only for predetermined list of sites associated with the embedded application. Some other limiting effects include the removal of administrative privileges, if those privileges existed in hub application. In this sense, the access token for the embedded application can be more restrictive that the token provided to the hub application. Accordingly, the embodiments are able to limit the scope of access granted by bearers of the embedded token according to policy, user consent, or applicability.

FIGS. 7, 8, 9, and 10 provide further details regarding the token brokering process. The token brokering process can include single brokering or double brokering, as will be described in more detail to follow.

Figure 7:
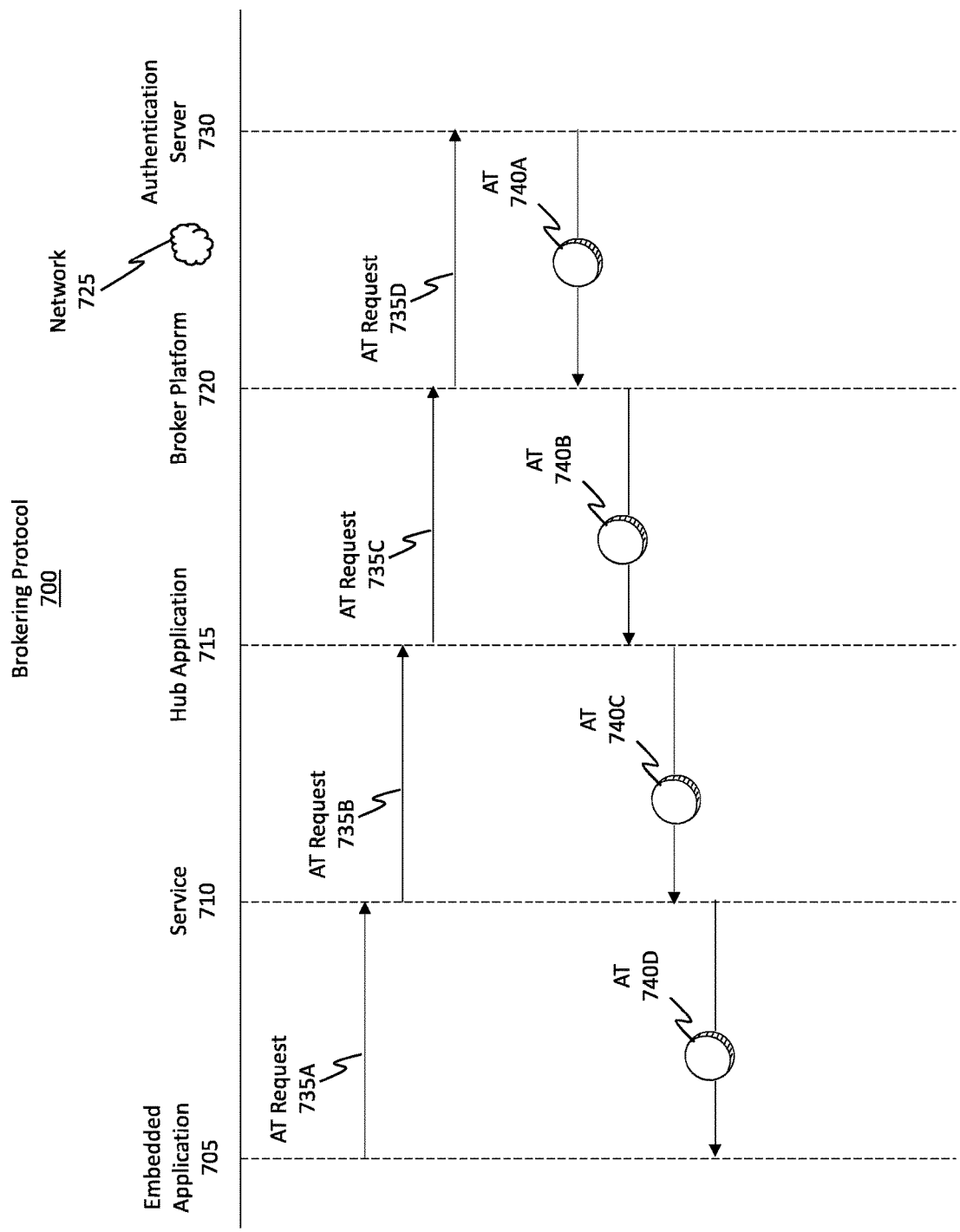
FIGS. 7, 8, 9, and 10 illustrate various improved process flows for authenticating an embedded application.

FIG. 7 shows an example brokering protocol 700 involving an embedded application, 705, a service 710 (e.g., service 620 from FIG. 6), a hub application 715, a broker platform 720, a network 725, and an authentication server 730. The processes outlined in FIG. 7 occur after the hub application 715 has been authenticated. In other words, the processes outlined in FIG. 7 occur after the dashed authenticated 535 line shown in FIG. 5.

By way of further clarification, the embodiments have already performed an authentication sign-in event to authenticate the hub application 715 with an account. As a result of the hub application 715 being authenticated, the hub application 715 receives, from the token broker platform 720, a first access token that represents a hydrated authentication state with the account. The embodiments have also already launched, from within the authenticated hub application 715, the embedded application 705. The embedded application 705 is initially stateless such that the embedded application 705 is not authenticated with the account.

While refraining from performing a subsequent authentication sign-in event, the embodiments cause the hub application 715 to perform token brokering on behalf of the embedded application 705 to enable the embedded application 705 to acquire a second access token that also represents hydrated authentication state with the account. The token brokering process is outlined in FIGS. 7, 8, 9, and 10.

In accordance with the disclosed principles, the embedded application 705 relies on the service 710 to send an access token (AT) request 735A to the hub application 715, as shown by AT request 735A and 735B. This communication occurs using the bridge 615 and the service 620 shown in FIG. 6.

The hub application 715 optionally determines whether the broker platform 720 is available. If the broker platform 720 is available, the hub application 715 can choose to delegate generation, retrieval, or acquisition of the access token to the token broker platform 720 by sending the AT request 735C to the broker platform 720. This communication occurs using the native bridge 235 described in FIG. 2 of the "native bridge" shown in FIG. 6. When this delegation occurs, then the double brokering process described previous is triggered.

Optionally, the broker platform 720 can query the operating system and ask the operating system where the request came from. The operating system can respond by informing the broker platform 720 as to where the request came from. For instance, the request can have a signature associated with it, where the signature is that of the embedded application and optionally of the hub application. These signatures can be considered as being a unique bundle ID or an cryptographically secured identifier. In some scenarios, the OS does not have the signature for the embedded application. The OS can, however, have the signature of the hub application because the hub application is a registered application with an app store. The hub application has a value from the hub application to identify the embedded application. The hub application passes this value to the OS, which then sends the value to the authentication server for verification along with the other request parameters. In this sense, the embodiments can perform various levels of validation by checking the signatures on the request. In most scenarios, the broker platform 720 does not actually authenticate a request because in most scenarios the broker platform 720 does not include credential information. Thus, the broker platform 720 requests an authentication server to perform the authentication. The cryptographically secured identifier expresses which applications are involved with the access token or access token request, and the authentication server can perform an authentication using that information.

The broker platform 720 transmits the AT request 735D to the authentication server 730 over the network 725. The cryptographically secured identifier (mentioned earlier) can be used by the authentication server 730 to authenticate the AT request 735D. That is, the authentication server 730 authenticates the AT request and generates an access token (AT) 740A, which is sent to the broker platform 720. Also, the cryptographically secured identifier can be used by the authentication server 730 to remove, add, or even modify claims or permissions from the generated AT 740A relative to the AT associated with the hub application. The broker platform 720 then uses the native bridge to send the AT 740B to the hub application 715. The hub application then uses the bridge 615 from FIG. 6 to send the AT 740C to the service 710, which provides the AT 740D to the embedded application 705.

The access token can be considered as a type of bearer token. The embedded application can then use the access token to validate its authentication with various protected resources, such as various APIs, including REST APIs. The embedded application presents the access token and is then permitted to access the protected resource. In this manner, the embodiments capitalize on the sign-in state of the hub application 715 and use that hydrated sign-in state to also allow the embedded application 705 to be authenticated.

Figure 8:
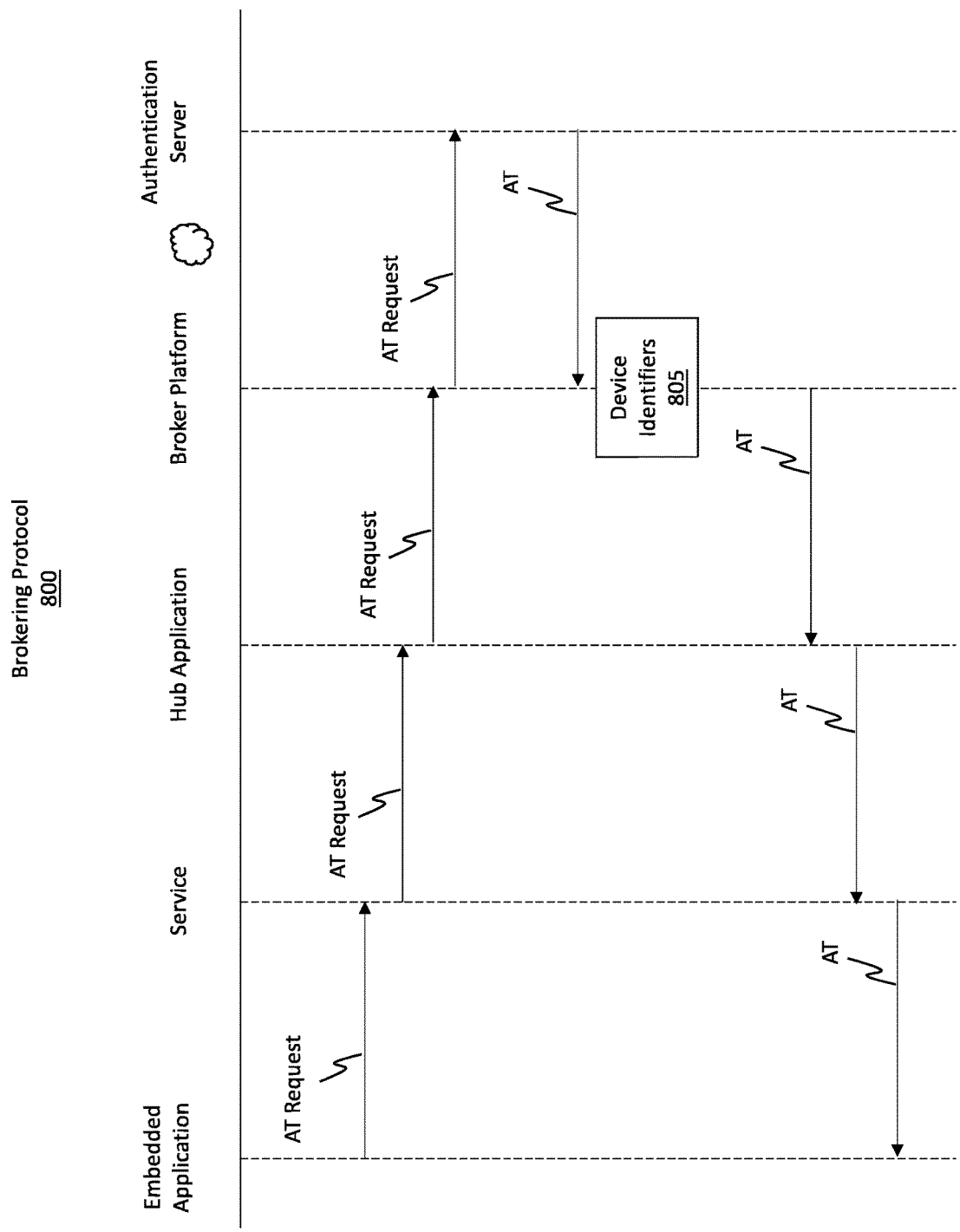

FIG. 8 shows another brokering protocol 800 that is similar to the brokering protocol 700 of FIG. 7. Many of the same operations are performed, so those duplicate operations are not labeled. The notable difference between FIG. 7 and FIG. 8 is that the embodiments can optionally embed various device identifiers 805 in the access token that is provided to the embedded application. A device identifier (e.g., device identifiers 805) for the computer system exists within the system's OS. Those device identifiers 805 do not typically exist, however, in the embedded application or the hub application. The OS is able to access those device identifiers 805. For instance, the OS, in some scenarios, has a key that can be provided to the authentication server. The authentication server then issues tokens, which have the device identifier in them.

In addition to the above example in which the OS has the key, another example may include a device having a hardware cryptographic module that provides public-key cryptographic services. These services secure a private key from direct access outside the module's security boundary while performing the digital signature using the private key on behalf of a client (e.g., an OS or application that can properly interact with the hardware module).

Stated differently, both the token broker platform and the hub application omit the device identifiers 805. The access token, however, can be hydrated or populated with the device identifiers 805. Generally, the device identifiers 805 include information to uniquely identify the device. The access token can be configured to include various different fields that can be populated with information. Some of those fields can be populated with the device identifiers 805, which are obtained from the device's OS and which can be obtained from the OS by the broker platform. FIG. 8 also shows a double brokering process.

Figure 9:
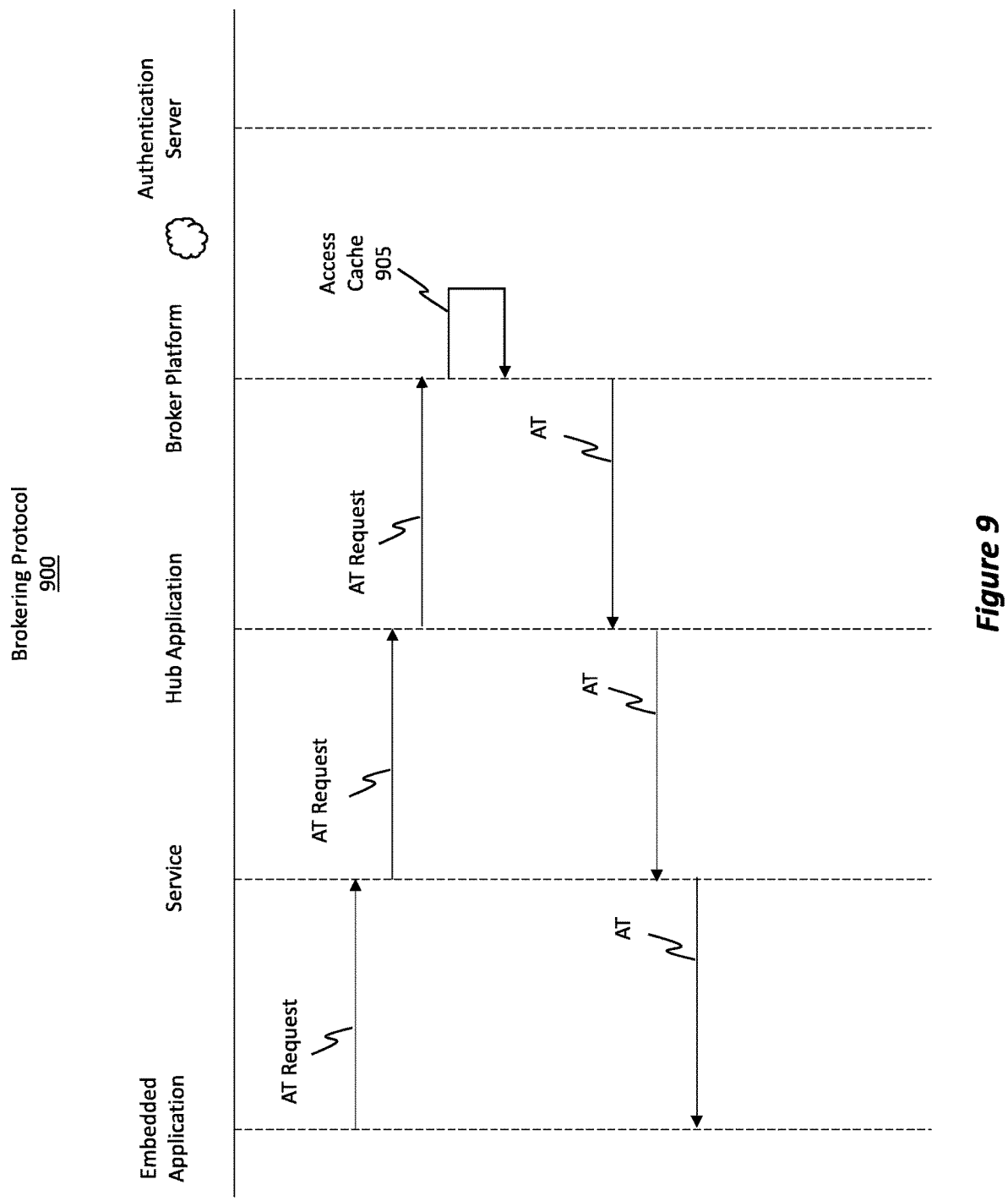

FIG. 9 shows an example brokering protocol 900 that is again similar to the previous brokering protocols. Common elements have not been labeled.

In this example scenario, the broker platform has stored or otherwise cached an access token that can be used for the embedded application. Therefore, instead of the broker platform reaching across the network to the authentication server, the broker platform can optionally operate to authenticate the embedded application. Additionally, the broker platform can access its cache to obtain an access token, as shown by access cache 905. FIG. 9 also generally describes a double brokering process.

Figure 10:
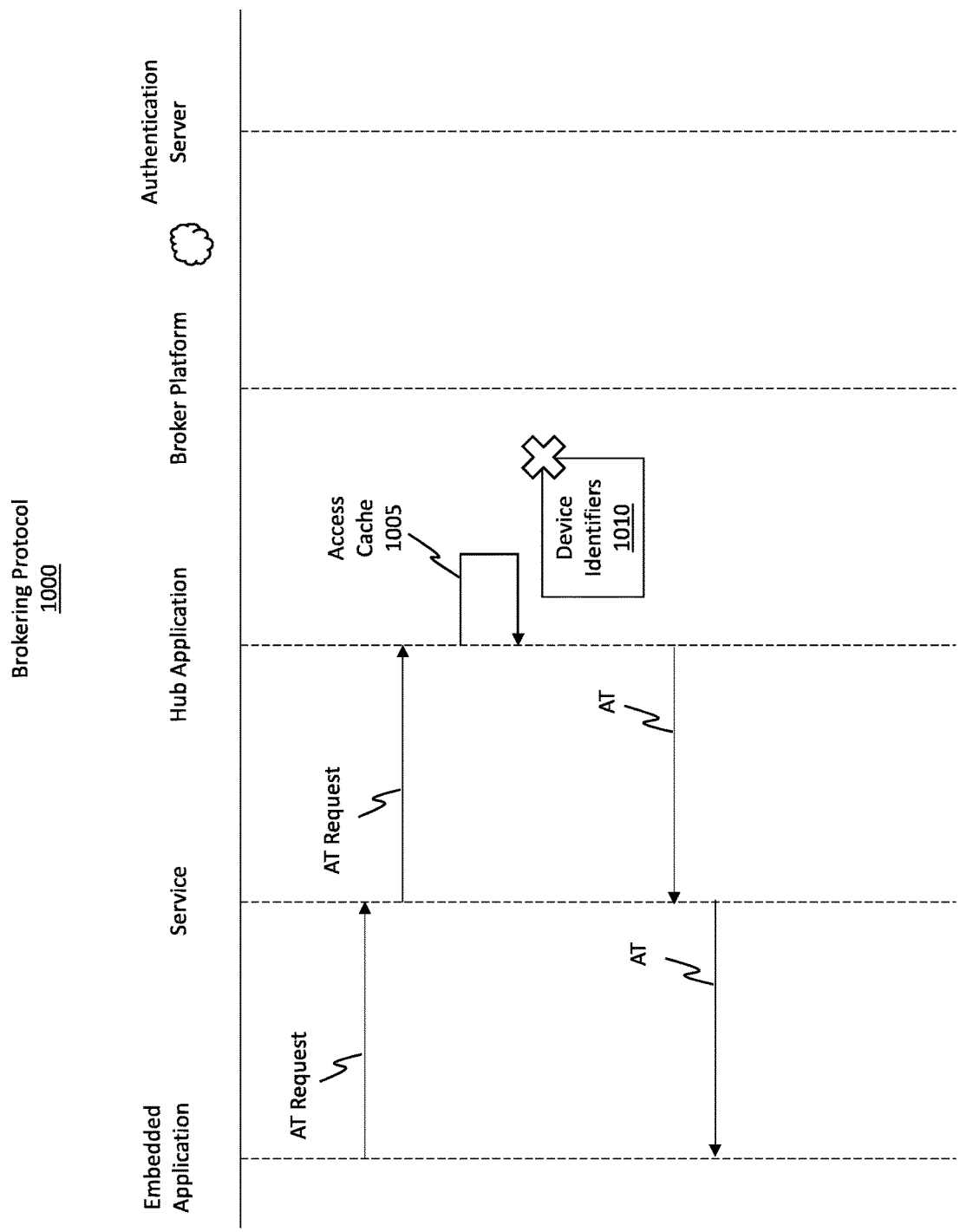

FIG. 10 shows yet another brokering protocol 1000. Here, the hub application is operating as an authentication entity and has cached or otherwise stored an access token that can be used by the embedded application. For instance, in response to receiving a request, the hub application can authenticate the embedded application based on a determination that the embedded application is operating within the hub application. The hub application can then access its cache to obtain an access token, as shown by access cache 1005. In this example scenario, however, the resulting access token will not be populated by device identifiers 1010 because the hub application does not maintain those device identifiers 1010. As mentioned, the OS maintained device identifiers. FIG. 10 describes a single brokering process because the hub application is not delegating the authentication process to another entity.

Figure 11:
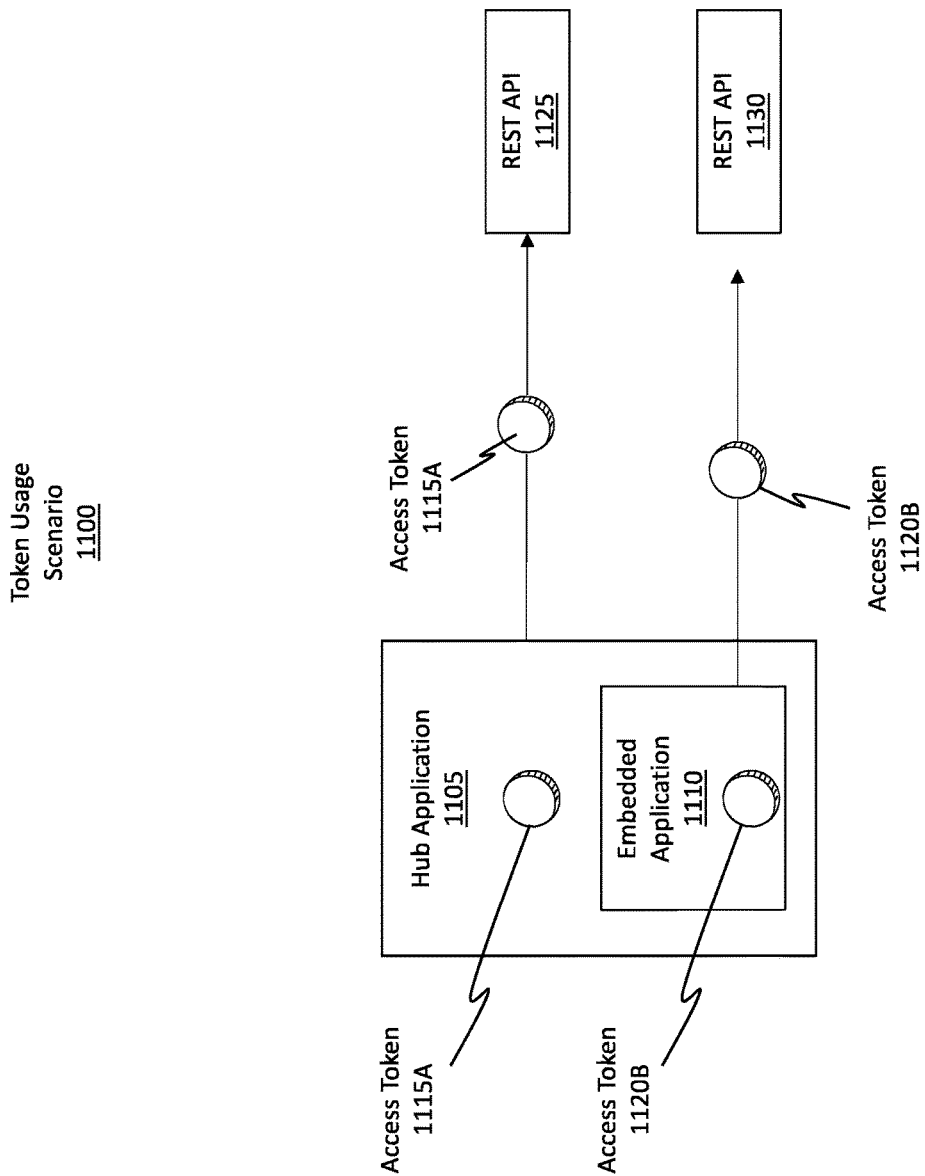
FIG. 11 illustrates a token brokering process.

FIG. 11 shows an example of a token usage scenario 1100. This scenario shows a hub application 1105 and an embedded application 1110. The hub application 1105 has been provided a first access token 1115A, and the embedded application 1110 has been provided a second access token 1120B. Both of these access tokens represent a hydrated sign-in state with regards to a particular account. The second access token 1120B was obtained as a result of the hub application 1105 having previously been authenticated. Also, the second access token 1120B was obtained without performing a second or subsequent sign-in event.

The hub application 1105 can use its respective access token 1115A to access a protected resource, such as a REST API 1125 (i.e. a form of a network call). Similarly, the embedded application 1110 can use its respective access token 1120B to access a protected resource, such as a REST API 1130. It is typically the case that the APIs are not local to the device; instead, the applications are able to make cross-network calls to remote APIs.

Multiple Embedded Applications

Figure 12:
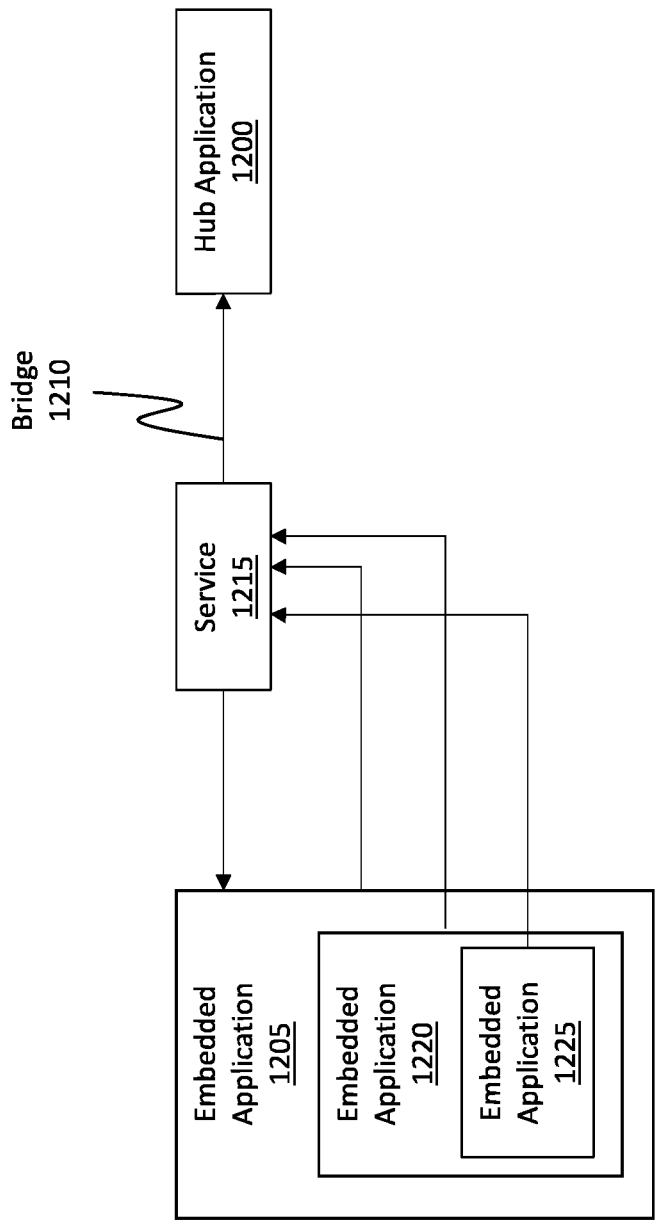
FIG. 12 illustrates how different applications can be embedded in other applications.

FIG. 12 shows a scenario involving a hub application 1200 and an embedded application 1205 that is embedded in that hub application 1200. A bridge 1210 is provided to facilitate communications between the hub application 1200 and the embedded application 1205. A service 1215, which is representative of the service 620 of FIG. 6, is configured as a part of the bridge 1210.

Recall, the embodiments allow the embedded application 1205 to communicate with the hub application 1200 via the bridge 1210. Such communications can optionally include access token requests and even the transmission of access tokens.

In some instances, a first embedded application, which is embedded in the hub application 1200, can itself host an embedded application. For instance, the embedded application 1220 is shown as being embedded in the embedded application 1205. Even further, the embedded application 1225 is shown as being embedded in the embedded application 1220. In accordance with the disclosed principles, each embedded application, regardless of its level of embedding, is able to communicate directly with the service 1215. That is, even if an embedded application is embedded in another application, both of those applications have the ability to communicate directly with the service 1215. Accordingly, the service 1215 and the bridge 1210 can operate in a parallel manner to support any number of embedded applications.

Example Methods

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 13A:
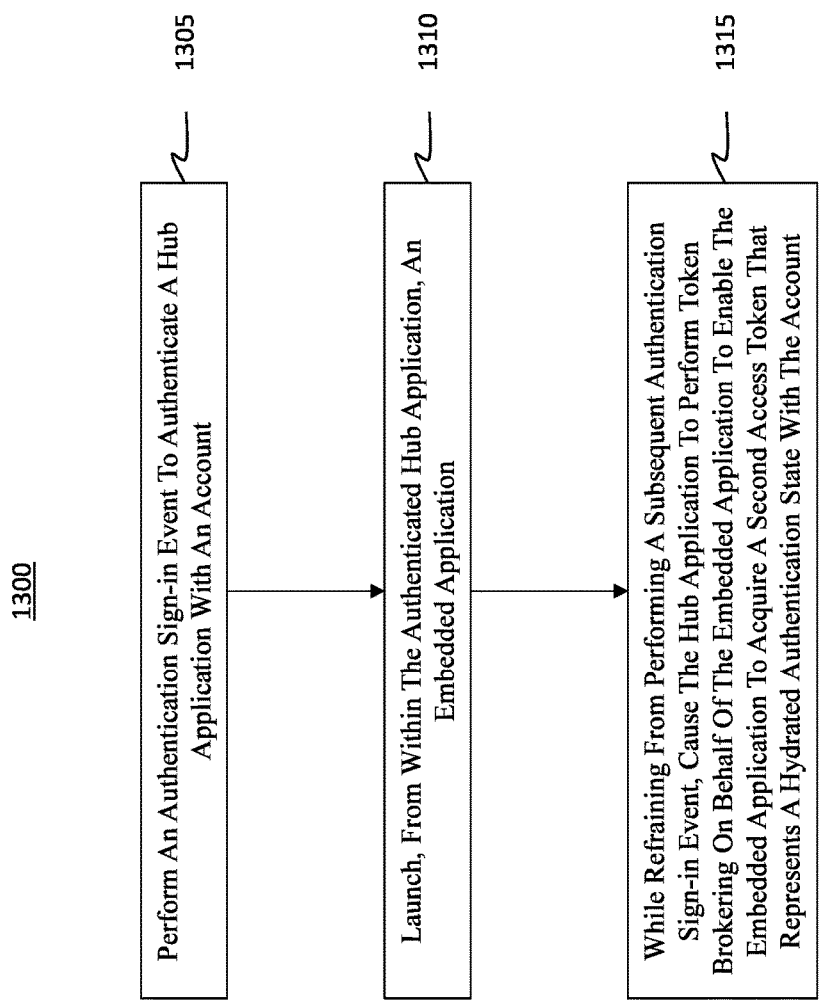
FIGS. 13A and 13B illustrate various flowcharts of an example method for authenticating an embedded application.
Figure 13B:
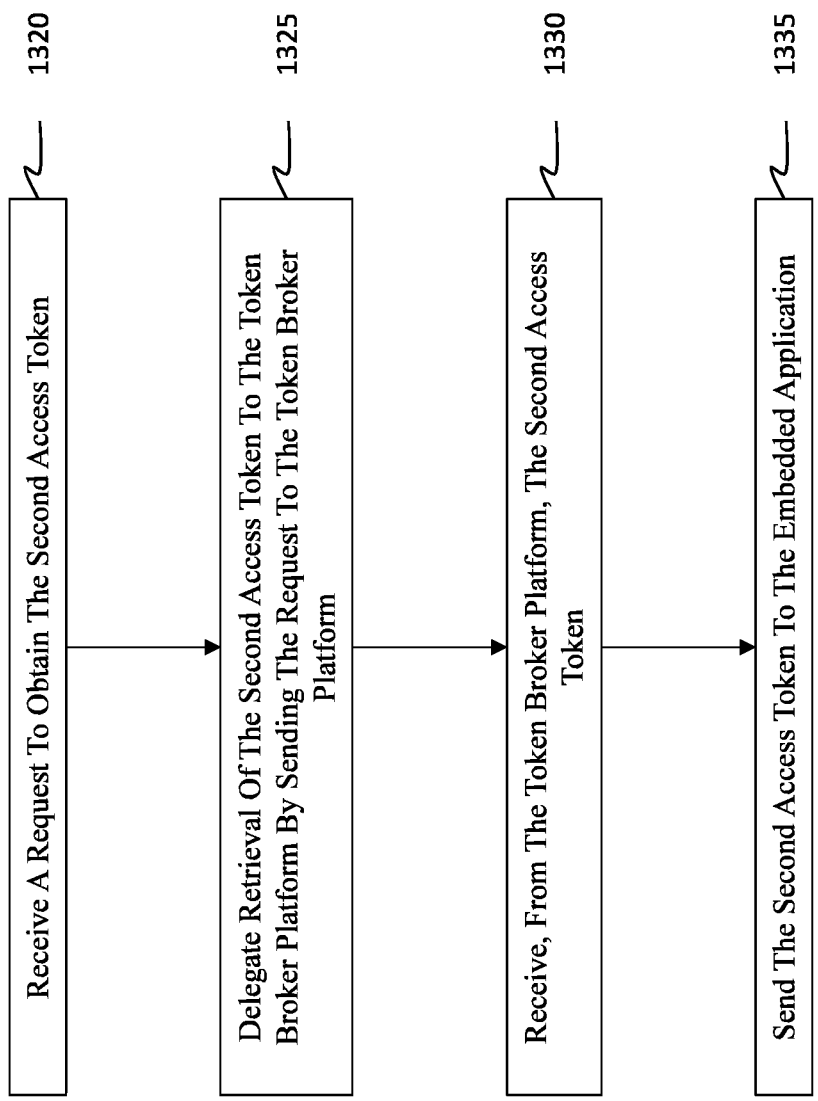

Attention will now be directed to FIGS. 13A and 13B, which illustrate various flowcharts of an example method 1300 for enabling a hub application to perform token brokering on behalf of an embedded application, which is embedded in the hub application, to thereby hydrate an authentication state for the embedded application. Method 1300 can be implemented within the architecture 600 of FIG. 6. Various portions of method 1300 can be implemented by the hub application 605, the embedded application 610, and the broker platform of FIG. 6. Optionally, method 1300 can be performed in either a web execution context (e.g., where various components are made available over a web interface) or an installed context (e.g., where various components are installed locally on a device).

Method 1300 includes an act (act 1305) of performing an authentication sign-in event to authenticate a hub application with an account, such as perhaps a tenant. As a result of the hub application being authenticated, the hub application receives, from a token broker platform, a first access token that represents a hydrated authentication state with the account. The token broker platform operates as a central single sign on (SSO) store for applications executing on the computer system.

Act 1310 includes launching, from within the authenticated hub application, the embedded application. The embedded application is initially stateless. As a result, the embedded application is not authenticated with the account.

While refraining from performing a subsequent authentication sign-in event, act 1315 includes causing the hub application to perform token brokering on behalf of the embedded application to enable the embedded application to acquire a second access token (e.g., a bearer token) that also represents the hydrated authentication state with the account. The second access token can optionally be the same as the first access token, such as perhaps a copy or perhaps even the same exact token. The token brokering process is outlined in FIG. 13B.

Act 1320, which is shown in FIG. 13B, involves the hub application receiving, from the embedded application, a request to obtain the second access token. The request to obtain the second access token is received over a communication bridge (e.g., bridge 615 of FIG. 6) that exists between the hub application and the embedded application. As described previously, a service is provisioned as a part of the communication bridge, and the service enables a scripting language that is a part of the embedded application to communicate with a native language that is a part of the hub application.

Some embodiments, in response to receiving the request to obtain the second access token from the embedded application, cause the hub application to add information to the request. This information is information about the account such that the token broker platform is informed for what account the second access token is being requested. Optionally, some embodiments, prior to this request being sent, cause the embedded application to obtain at least some account information from the hub application. The embedded application can then include some of that information in its request to obtain the second access token.

Act 1325 involves the hub application delegating generation, acquisition, or retrieval of the second access token to the token broker platform by sending the request to the token broker platform, which is a part of an operating system of the computer system. The process in which the hub application delegates the generation, acquisition, or retrieval of the second access token to the token broker platform by sending the request to the token broker platform is referred to as a "double brokering operation." Notably, the hub application further includes functionality for performing "single brokering." This single brokering includes the hub application generating, acquiring, retrieving, or accessing an additional access token.

It is typically the case that the token broker platform does not generate the second access token itself. Instead, the second access token is generated remotely relative to the token broker platform. For instance, the authentication server mentioned previously may be the entity that generates the second access token. In some embodiments, the OS can be used to broker the token.

Act 1330 involves the hub application receiving, from the token broker platform, the second access token. The second access token is obtained based on the hydrated authentication state that currently exists for the account.

Act 1335 involves the hub application sending the second access token to the embedded application. Optionally, method 1300 can include an act of causing the embedded application to use the second access token to access a protected resource. In one example, the protected resource can be an application programming interface (API), and the API validates the second access token. Once validated, the embedded application can utilize various program features that are made available to it via the API.

In some implementations, method 1300 can include additional acts. For instance, method 1300 can include an act of determining that a second embedded application is embedded in the hub application. Another act involves subsequently determining that the token broker platform is not available. Another act involves causing the hub application to generate, acquire, or retrieve a third access token (e.g., an example of a single brokering process). Yet another act involves sending the third access token to the second embedded application. The hub application can access an identity from an operating system of the computer system to generate, acquire, or retrieve the third access token.

In some implementations, the token brokering process can include some additional actions. For instance, the hub application can communicate with the token broker platform, and this communication can involve a parameter that specifies both the hub application and the embedded application. The token broker platform communicates with a remote service (e.g., the authentication server, which is implementing a security token service) to obtain the second access token, where the communication between the token broker platform and the remote service includes transmitting the parameter, which identifies both the hub application and the embedded application, to the remote service. In some scenarios, the parameter can be an identifier of the hub application, an identifier of the embedded application, an identifier of a restriction to place on the generated token, an indication of a policy that is to be implemented, an identification of a user, device, or even of an account. A first validation can be performed by the token broker platform to validate an identity of the hub application. A second validation can be performed by the hub application to validate an identity of the embedded application. The embedded application's identity is verified (e.g., typically by the token issuance service with metadata supplied by the hub) to ensure that an embedded application does not impersonate another application, thereby tricking the hub application to grant the embedded application tokens/access it would otherwise not have. It is typically not desirable to ask an embedded application to identify itself because a bad actor/malicious application may present a false identity which it could bootstrap into accessing data or performing actions that would otherwise only be available to the 'real identity'. As a result, the embodiments can beneficially perform the above validations to protect against such a scenario.

Accordingly, the disclosed embodiments beneficially solve the double sign-in problem that has existed for embedded applications. In doing so, significant benefits and advantages can be realized, as described herein.

Example Computer/Computer Systems

Figure 14:
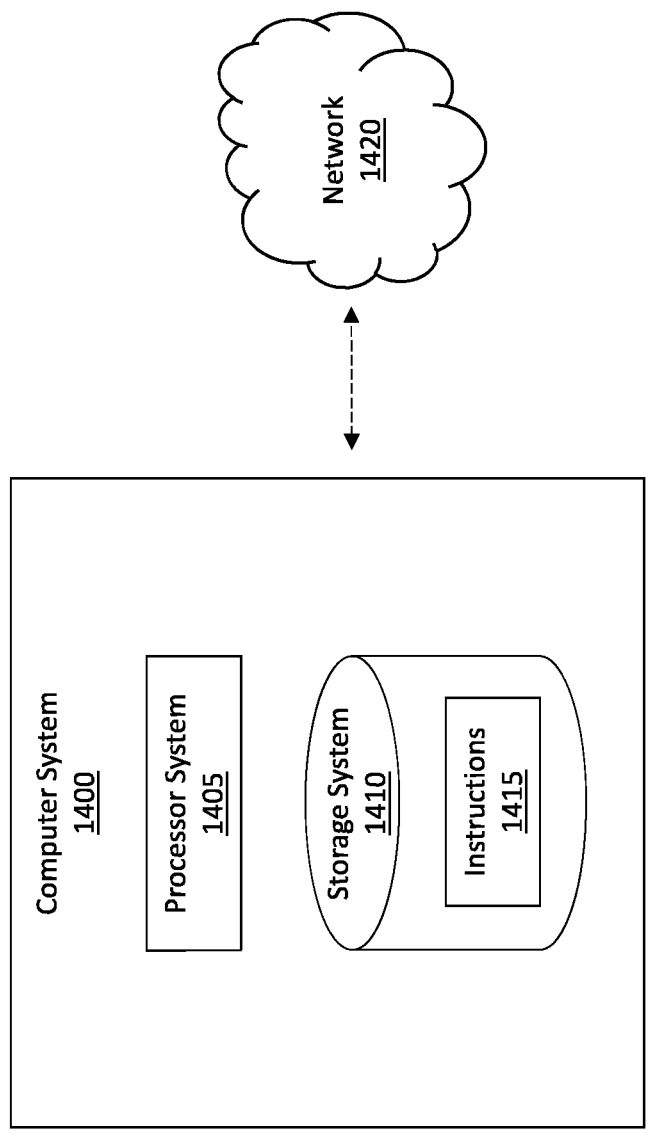
FIG. 14 illustrates an example computer system that can be configured to perform any of the disclosed operations.

Attention will now be directed to FIG. 14 which illustrates an example computer system 1400 that may include and/or be used to perform any of the operations described herein. Computer system 1400 may take various different forms. For example, computer system 1400 may be embodied as a tablet, a desktop, a laptop, a mobile device, or a standalone device, such as those described throughout this disclosure. Computer system 1400 may also be a distributed system that includes one or more connected computing components/devices that are in communication with computer system 1400. Computer system 1400 can implement any of the architectures described herein.

In its most basic configuration, computer system 1400 includes various different components. FIG. 14 shows that computer system 1400 includes a processor system 1405 that includes one or more processor(s) (aka a "hardware processing unit") and storage system 1410.

Regarding the processor(s) of the processor system 1405, it will be appreciated that the functionality described herein can be performed, at least in part, by one or more hardware logic components (e.g., the processor(s)). For example, and without limitation, illustrative types of hardware logic components/processors that can be used include Field-Programmable Gate Arrays ("FPGA"), Program-Specific or Application-Specific Integrated Circuits ("ASIC"), Program-Specific Standard Products ("ASSP"), System-On-A-Chip Systems ("SOC"), Complex Programmable Logic Devices ("CPLD"), Central Processing Units ("CPU"), Graphical Processing Units ("GPU"), or any other type of programmable hardware.

As used herein, the terms "executable module," "executable component," "component," "module," "service," "interface," or "engine" can refer to hardware processing units or to software objects, routines, or methods that may be executed on computer system 1400. The different components, modules, engines, and services described herein may be implemented as objects or processors that execute on computer system 1400 (e.g. as separate threads).

Storage system 1410 can include physical system memory, which may be volatile, non-volatile, or some combination of the two. The term "memory" may also be used herein to refer to non-volatile mass storage such as physical storage media. If computer system 1400 is distributed, the processing, memory, and/or storage capability may be distributed as well.

Storage system 1410 is shown as including executable instructions 1415. The executable instructions 1415 represent instructions that are executable by the processor(s) of computer system 1400 to perform the disclosed operations, such as those described in the various methods.

The disclosed embodiments may comprise or utilize a special-purpose or general-purpose computer including computer hardware, such as, for example, one or more processors and system memory, as discussed in greater detail below. Embodiments also include physical and other computer-readable media for carrying or storing computer-executable instructions and/or data structures. Such computer-readable media can be any available media that can be accessed by a general-purpose or special-purpose computer system. Computer-readable media that store computer-executable instructions in the form of data are "physical computer storage media" or a "hardware storage device." Furthermore, computer-readable storage media, which includes physical computer storage media and hardware storage devices, exclude signals, carrier waves, and propagating signals. On the other hand, computer-readable media that carry computer-executable instructions are "transmission media" and include signals, carrier waves, and propagating signals. Thus, by way of example and not limitation, the current embodiments can comprise at least two distinctly different kinds of computer-readable media: computer storage media and transmission media.

Computer storage media (aka "hardware storage device") are computer-readable hardware storage devices, such as RAM, ROM, EEPROM, CD-ROM, solid state drives ("SSD") that are based on RAM, Flash memory, phase-change memory ("PCM"), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

Computer system 1400 may also be connected (via a wired or wireless connection) to external sensors (e.g., one or more remote cameras) or devices via a network 1420. For example, computer system 1400 can communicate with any number devices or cloud services to obtain or process data. In some cases, network 1420 may itself be a cloud network. Furthermore, computer system 1400 may also be connected through one or more wired or wireless networks to remote/separate computer systems(s) that are configured to perform any of the processing described with regard to computer system 1400.

A "network," like network 1420, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. Computer system 1400 will include one or more communication channels that are used to communicate with the network 1420. Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer system that enables a hub application to perform token brokering on behalf of an embedded application, which is embedded in the hub application, to thereby hydrate an authentication state for the embedded application, said computer system comprising:
a processor system; and
a storage system comprising instructions that are executable by the processor system to cause the computer system to:
perform an authentication sign-in event to authenticate a hub application with an account, wherein, as a result of the hub application being authenticated, the hub application receives, from a token broker platform, a first access token that represents a hydrated authentication state with the account, and wherein the token broker platform operates as a central single sign on (SSO) store for applications executing on the computer system;
launch, from within the authenticated hub application, the embedded application, wherein the embedded application is initially stateless such that the embedded application is not authenticated with the account;
while refraining from performing a subsequent authentication sign-in event, cause the hub application to perform token brokering on behalf of the embedded application to enable the embedded application to acquire a second access token that also represents the hydrated authentication state with the account, wherein a device identifier for the computer system exists within an operating system (OS) of the computer system, wherein the second access token is hydrated with the device identifier, which is obtained from the OS, and wherein the token brokering comprises:
the hub application receiving, from the embedded application, a request to obtain the second access token;
the hub application assembling a reply address for the embedded application based, at least in part, on an identification (ID) of the hub application, which is hosting the embedded application;
the hub application delegating retrieval of the second access token to the token broker platform by sending the request to the token broker platform, wherein the request includes the reply address of the embedded application;
the hub application receiving, from the token broker platform, the second access token, wherein the second access token is obtained based on the hydrated authentication state that currently exists for the account; and
the hub application sending the second access token to the embedded application.

2. The computer system of claim 1, wherein the embedded application is abstracted from the OS of the computer system such that the embedded application is prevented from authenticating directly with the OS.

3. The computer system of claim 1, wherein:
the request to obtain the second access token is received over a communication bridge that exists between the hub application and the embedded application, and
the communication bridge operates to convert an operation implemented in a scripting language of the embedded application to an operation implemented in a native language of the hub application.

4. The computer system of claim 1, wherein execution of the instructions further causes the computer system to cause the embedded application to use the second access token to access a protected resource.

5. The computer system of claim 1, wherein the embedded application is one of a first party extension application or a third party extension application.

6. The computer system of claim 1, wherein the embedded application is a web application that uses one or more of HyperText Markup Language (HTML), Cascading Style Sheets (CSS), or JavaScript.

7. The computer system of claim 1, wherein the embedded application is a WebView application.

8. The computer system of claim 1, wherein both the token broker platform and the hub application omit the device identifier.

9. The computer system of claim 1, wherein execution of the instructions further causes the computer system to use the second access token to access a protected resource, wherein the protected resource is an application programming interface (API), and wherein the API validates the second access token.

10. The computer system of claim 1, wherein the hub application delegating retrieval of the second access token to the token broker platform by sending the request to the token broker platform operates as a double brokering operation, and
wherein the hub application further includes functionality for performing single brokering, and wherein, when the hub application performs the single brokering, the hub application, as opposed to the token broker platform, retrieves one or more access tokens for the embedded application.

11. A method for enabling a hub application to perform token brokering on behalf of an embedded application, which is embedded in the hub application, to thereby hydrate an authentication state for the embedded application, said method comprising:
performing an authentication sign-in event to authenticate a hub application with an account, wherein, as a result of the hub application being authenticated, the hub application receives, from a token broker platform, a first access token that represents a hydrated authentication state with the account, and wherein the token broker platform operates as a central single sign on (SSO) store for the hub application, which is executing on a computer system;
launching, from within the authenticated hub application, the embedded application, wherein the embedded application is initially stateless such that the embedded application is not authenticated with the account;
while refraining from performing a subsequent authentication sign-in event, causing the hub application to perform token brokering on behalf of the embedded application to enable the embedded application to acquire a second access token that also represents the hydrated authentication state with the account, wherein a device identifier for the computer system exists within an operating system (OS) of the computer system, wherein the second access token is hydrated with the device identifier, which is obtained from the OS, and wherein the token brokering comprises:
the hub application receiving, from the embedded application, a request to obtain the second access token;
the hub application assembling a reply address for the embedded application based, at least in part, on an identification (ID) of the hub application, which is hosting the embedded application;
the hub application delegating retrieval of the second access token to the token broker platform by sending the request to the token broker platform, wherein the request includes the reply address of the embedded application;
the hub application receiving, from the token broker platform, the second access token, wherein the second access token is obtained based on the hydrated authentication state that currently exists for the account; and
the hub application sending the second access token to the embedded application.

12. The method of claim 11, wherein the method is performed in either a web execution context or an installed context.

13. The method of claim 11, wherein a service is provisioned as a part of a communication bridge between the hub application and the embedded application, and wherein the service enables a scripting language that is a part of the embedded application to communicate with a native language that is a part of the hub application.

14. The method of claim 11, wherein the token broker platform is a part of the OS of the computer system, which implements the method.

15. The method of claim 11, wherein the method further includes:
determining that a second embedded application is embedded in the hub application;
subsequently determining that the token broker platform is not available;
causing the hub application to retrieve a third access token; and
sending the third access token to the second embedded application, wherein the hub application accesses the device identifier from the OS of the computer system, which that implements the method to retrieve the third access token.

16. A method for enabling a hub application to perform token brokering on behalf of an embedded application, which is embedded in the hub application, to thereby hydrate an authentication state for the embedded application, said method comprising:
performing an authentication sign-in event to authenticate a hub application with an account, wherein, as a result of the hub application being authenticated, the hub application receives, from a token broker platform, a first access token that represents a hydrated authentication state with the account, and wherein the token broker platform operates as a central single sign on (SSO) store for the hub application, which is executing on a computer system;
launching, from within the authenticated hub application, the embedded application, wherein the embedded application is initially stateless such that the embedded application is not authenticated with the account;
while refraining from performing a subsequent authentication sign-in event, causing the hub application to perform token brokering on behalf of the embedded application to enable the embedded application to acquire a second access token that also represents the hydrated authentication state with the account, wherein a device identifier for the computer system exists within an operating system (OS) of the computer system, wherein the second access token is hydrated with the device identifier, which is obtained from the OS, and wherein the token brokering comprises:
the hub application receiving, from the embedded application, a request to obtain the second access token, wherein the request is received over a communication bridge that exists between the hub application and the embedded application, wherein a service is provisioned as a part of the communication bridge, and wherein the service enables a scripting language that is a part of the embedded application to communicate with a native language that is a part of the hub application;

the hub application assembling a reply address for the embedded application based, at least in part, on an identification (ID) of the hub application, which is hosting the embedded application;

the hub application delegating retrieval of the second access token to the token broker platform by sending the request to the token broker platform, wherein the request includes the reply address of the embedded application;

the hub application receiving, from the token broker platform, the second access token, wherein the second access token is obtained based on the hydrated authentication state that currently exists for the account; and the hub application sending the second access token to the embedded application.

17. The method of claim 16, wherein, in response to receiving the request to obtain the second access token from the embedded application, the hub application adds information to the request, where the information is information about the account, such that the token broker platform is informed for what account the second access token is being requested.

18. The method of claim 16, wherein the second access token is generated remotely relative to the token broker platform.

19. The method of claim 18, wherein the token brokering further includes:

the hub application communicating with the token broker platform, said communicating involving a parameter that specifies both the hub application and the embedded application;

the token broker platform communicating with a remote service to obtain the second access token, wherein the communicating between the token broker platform and the remote service includes transmitting the parameter, which identifies both the hub application and the embedded application, to the remote service; and wherein a first validation is performed by the token broker platform to validate an identity of the hub application and a second validation is performed by the hub application to validate an identity of the embedded application.

20. The method of claim 16, wherein the second access token is a bearer token.

* * * * *